United States Patent Office 3,515,690
Patented June 2, 1970

3,515,690
COPOLYMER SALTS FOR WATER DILUTABLE SURFACE COATING COMPOSITIONS
Thomas Hunt, Barry, Glamorgan, Wales, assignor to British Resin Products Limited, London, England, a British company
No Drawing. Filed Nov. 13, 1967, Ser. No. 682,602
Claims priority, application Great Britain, Nov. 29, 1966, 53,291/66
Int. Cl. C08f 21/00, 21/04; C09d 3/68
U.S. Cl. 260—22                                  5 Claims

ABSTRACT OF THE DISCLOSURE

A copolymer salt for use in surface coating compositions having improved water resistance when dried in air to form films wherein the salt is formed from a primary $C_1$ or $C_2$ alkyl amine and a copolymer formed by (a) reacting an ester of a polyhydric alcohol and an unsaturated fatty acid (e.g. linseed oil) with an acyclic olefinically unsaturated dicarboxylic acid or anhydride (e.g. maleic acid or anhydride) and (b) copolymerizing the reaction product (e.g. maleinized linseed oil) so formed with an unsaturated monomer (e.g. styrene) copolymerizable therewith.

---

The present invention is concerned with improvements in or relating to salts of copolymers formed from oil/acid reaction products and unsaturated monomers copolymerizable therewith and to water dilutable surface coating compositions containing these salts which are capable of drying in air to form films.

Salts of this type of copolymer and water dilutable air drying surface coating compositions containing these salts are known.

It is an object of the present invention to provide salts of copolymers of the foregoing type adapted to form the basis of water dilutable surface coating compositions which, when dried in air, form films having improved water resistance.

A copolymer salt according to the present invention comprises a salt of a primary $C_1$ or $C_2$ alkyl amine and a copolymer formed by (a) reacting an ester of a polyhydric alcohol and an unsaturated fatty acid having at least 12 carbon atoms in the carbon chain containing the unsaturation with an acyclic olefinically unsaturated dicarboxylic acid or anhydride having less than 10 carbon atoms in any carbon chain and (b) copolymerizing the reaction product so formed with up to 50 percent by weight in relation to the total weight of reactants initially present of an unsaturated monomer copolymerizable therewith.

Most suitably the ester of a polyhydric alcohol and an unsaturated fatty acid having at least 12 carbon atoms in the carbon chain containing the unsaturation is drying or semi drying oil. Some examples of drying oils are tung, oiticia, linseed, cotton seed, dehydrated castor, perilla, and unsaturated fish oils, some examples of semi drying oils are tobacco seed, sunflower seed, safflower seed, and soya bean oil. Glycerol fully esterified with tall oil fatty acids, can also be used. The semi drying oils may be defined as oils which do not contain more than 10 percent by weight of linolenic acid residues and which have an iodine value in the range 125–155 milligrams per gram as estimated by the method described in British Standard specification 684. The preferred semi drying oils contain less than 5 percent by weight of linolenic acid residues. Copolymers formed from the reaction products of the semi drying oils show little tendency to yellow with age.

Most drying or semi drying oils are triglyceride esters of the unsaturated fatty acids having at least 12 carbon atoms in the carbon chain containing the unsaturation. Other esters which can be used are for example the trimethylol propane or pentaerythritol esters of said acids. The fatty acids are usually obtained from the drying or semi drying oils by saponification. Tall oil can be used and consists of unsaturated fatty acids.

Most suitably the acyclic olefinically unsaturated dicarboxylic acids are the α-ethylenically unsaturated dicarboxylic acids and preferably α-ethylenically unsaturated α,β-dicarboxylic acids. The term acyclic olefinically unsaturated dicarboxylic acids includes the anhydrides of the acid. Some examples of these acids are maleic, fumaric, aconitic, itaconic and alkyl substituted maleic acids having less than 10 carbon atoms in any uninterrupted carbon chain. Specific derivatives which can be used are citraconic anhydride and maleic acid partially esterified with an aliphatic alcohol. Citric acid when subjected to the conditions under which citraconic anhydride or itaconic acid is produced (Bernthsen Textbook of Organic Chemistry (1923) pages 250–256) can also be employed.

The reaction between the ester of the polyhydric alcohol and the unsaturated fatty acid with the acyclic olefinically unsaturated dicarboxylic acids is well known and has been described for example in British Patent 1,018,032 (application date May 3, 1961). The reaction can be carried out in the presence of minor amounts of synthetic and naturally occurring dienes which modify the reaction product. Some examples of these dienes are cyclopentadiene and butadiene. These compounds react by way of a Diels Alder reaction with the dicarboxylic acid. Minor amounts of the unsaturated fatty acids hereinbefore described may be included.

The preferred reaction products are those produced by reacting maleic anhydride or fumaric acid with linseed oil or in cases where colour retention is an important factor, a semi drying oil. The amount of acyclic olefinically unsaturated dicarboxylic acid used to form the reaction product influences the water solubility of the salts of the copolymer finally produced. Broadly, the higher the proportion of dicarboxylic acid, the higher will be the water solubility of the copolymer. Most suitably the proportion by weight of dicarboxylic acid initially present in the reaction mixture is in the range 5–25 percent. In the case of maleic anhydride these proportions would give reaction products with total acid values, as determined experimentally, within the range of 40 to 200 milligrams KOH per gram. The preferred range of total acid values is 50 to 150 milligrams KOH per gram.

The unsaturated monomer copolymerizable with the reaction product most suitably is a compound containing ethylenic unsaturation such as a substituted aromatic compound having an aliphatic group containing ethylenic unsaturation or an alkyl ester of an α-unsaturated aliphatic mono carboxylic acid or mixture thereof. The substituted aromatic compound can have vinyl or substituted vinyl unsaturation and some examples are vinyl toluene, styrene and α-methyl styrene. The preferred aromatic compound is styrene. Most suitably the alkyl groups of the alkyl esters of α-unsaturated aliphatic mono carboxylic acids contain up to 4 carbon atoms. Some examples of these esters are the alkyl esters of acrylic or methacrylic acid e.g., methyl methacrylate. Minor amounts of acrylic or methacrylic acid may also be included in addition to the copolymerizable monomers previously described.

The amount of copolymerizable unsaturated monomer which can be used to form the copolymer must not exceed 50 percent by weight of the combined weight of the total reactants initially present in the polymerization. The preferred amount of monomer is between 10 and 40 percent by weight of the combined weight of the reactants initially present.

The copolymerization may be carried out using any of the known polymerization techniques applied to this type of reaction. For example, it may be carried out in the presence of a free radical polymerization catalyst such as tertiary butyl peroxide, cumene hydroperoxide or benzoyl peroxide. Preferably the copolymerization is carried out at atmospheric pressure, optionally in the presence of an inert gas such as carbon dioxide or nitrogen. The preferred copolymers have an acid value in the range 25 to 100 milligrams of potassium hydroxide per gram.

The primary $C_1$ or $C_2$ alkyl amines which can be used to form the salt of the copolymer are methylamine and ethylamine.

The salt is most suitably obtained by dissolving the copolymer in an aqueous solution containing the amine. Preferably the copolymer, amine and water are refluxed together until the salt is formed. Preferably the amount of amine employed is sufficient to give an aqueous solution having a pH in the range 7 to 8.

The salts of the copolymer provide an excellent basis for water-dilutable, surface-coating compositions which are capable of drying in air to form films. An aspect of the present invention is the provision of water-dilutable, surface coating compositions containing the salts of the copolymers hereinbefore described. By water-dilutable is meant that water can be added to the compositions without causing precipitation of insoluble material. The water-dilutable compositions can comprise aqueous solutions of the salts of the copolymers. It may be desirable to add a water-miscible solvent to the salt solution to improve solubility and give better flow characteristics to the compositions. Any solvent may be employed provided that it is sufficiently water-miscible to give homogeneous compositions. Some examples are the lower alkanols, e.g. isobutanol and the mono alkyl ethers of ethylene glycol e.g. ethylene glycol mono butyl ether. The usual metallic driers such as cobalt naphthenate, fillers and pigments are generally present in these compositions.

The use of the salts of the copolymers according to the invention in surface coating compositions gives films which when dried in air have better water resistance than the salts of the copolymers derived from the corresponding secondary and tertiary amines and the other primary amines. This performance is unexpected e.g. from the vapour pressure data on the amines and their aqueous solutions.

The following examples illustrate the preparation of salts of copolymers according to the present invention and water-dilutable, surface-coating compositions containing these salts.

EXAMPLE 1

Linseed oil (800 grams) and maleic anhydride (200 grams) were heated and stirred to 220° C. under nitrogen. Heating at 220–225° C. was continued for 6½ hours, then the maleinized linseed oil reaction product was cooled to room temperature.

The maleinized oil (1,000 grams) was heated to 150° C. and a mixture of styrene (333 grams) and ditertiary butyl peroxide (10 grams) was added over 3½ hours, keeping the temperature at 150° C. When all the monomer had been added, heating at 150° C. was continued for a further half an hour then the temperature was raised to 190° C. After heating for 30 minutes at 190° C. the styrenated maleinized linseed oil copolymer was cooled to room temperature.

100 gram portions of the copolymer were converted to the methylamine, and ethylamine salt solutions by refluxing the copolymer base and water for 4 hours. After cooling 20 grams butyl Cellosolve were added to each solution to give 50 percent solids. By way of comparison the n-butylamine, di and trimethylamine and di and triethylamine salts were formed in a similar manner. The actual charges used for each 100 grams of copolymer are: (a) Triethylamine salt, 9 grams triethylamine, 71 grams water. (b) Diethylamine salt, 6.5 grams diethylamine. 73.5 grams water. (c) Ethylamine salt, 5.75 grams 70% ethylamine solution, 74.25 grams water. (d) Trimethylamine salt, 13 grams 40% trimethylamine solution, 67 grams water. (e) Dimethylamine salt, 10 grams 40% dimethylamine, 70 grams water. (f) Methylamine salt, 6.9 grams 40% methylamine, 73.1 grams water. (This charge required a further 2 grams base to get water soluble salt.) (g) n-butylamine salt, 6.5 grams n-butylamine, 73.5 grams water. (This charge was refluxed for 4 hours then butyl Cellosolve (20 grams) was added. A further 7 grams butylamine was required to give a water soluble salt.)

It can be seen from the foregoing that all of the above solutions contain an equimolar quantity of base.

Solutions for the preparation of films were prepared by adding 0.1 ml. water dispersible cobalt driers containing 6 percent cobalt metal to 10 gram portions of the 50 percent solids salt solution previously described. Films of the solution were prepared on glass plates using a 0.003 inch applicator and these were allowed to air dry for 16–18 hours. After this time the films were tested for water resistance by applying small squares of polyurethane sponge soaked in water. The sponges were removed from time to time and the condition of the films assessed. Table 1 below summarizes the results which demonstrate the superior water resistance of the methylamine and ethylamine salts in comparison with the corresponding secondary and tertiary amine salts and the n-butylamine salts.

TABLE 1

| Copolymer salt | Observations on treated film | | |
|---|---|---|---|
| | 30 minutes | 60 minutes | 150 minutes |
| Methylamine salt | Unaffected | Unaffected | Unaffected. |
| Ethylamine salt | do | Very slight blistering. | Large blisters. |
| Dimethylamine salt | Badly blistered and disintegrated when rubbed gently. | | |
| Trimethylamine salt | Do. | | |
| Diethylamine salt | Do. | | |
| Triethylamine salt | Do. | | |
| n-Butylamine | Mass of small blisters and whitened badly. | Did not recover on drying out. | |

EXAMPLE 2

Soya bean oil (1020 grams) and maleic anhydride (180 grams) were heated for 5 hours at 200–225° C. under nitrogen then cooled to room temperature.

The oil (875 grams) was heated to 150° C. and a mixture of styrene (437.5 grams) and ditertiary butyl peroxide was added slowly over 4 hours, holding the temperature at 150° C. Heating at 150° C. was continued for 2½ hours than the styrenated oil was cooled to room temperature.

100 gram portions of copolymer were converted to the methylamine and ethylamine salt solutions by refluxing the copolymers, bases and water for 4 hours. After cooling, 20 grams butyl Cellosolve were added to each solution to give 50% solids. By way of comparison similar solutions were made of the di and trimethylamine and ethylamine salts and the n-butyl amine salt. The charges used for each 100 gms. of copolymers were:

|  | Gms. water |
|---|---|
| (a) Triethylamine salt, 9 gms. triethylamine | 71 |
| (b) Diethylamine salt, 6.5 gms. diethylamine | 73.5 |
| (c) Ethylamine salt, 5.75 gms. ethylamine 70% solution | 74.25 |
| (d) Trimethylamine salt, 13 gms. 40% trimethylamine solution | 67 |
| (e) Dimethylamine salt, 10 gms. 40% dimethylamine solution | 70 |
| (f) Methylamine salt, 6.9 gms. 40% methylamine solution | 73.1 |
| (g) n-Butylamine salt, 6.5 gms. n-butylamnie | 73.1 |

(This charge required a further 8 gms. base to give a water soluble salt.)

Samples of each solution (10 gms.) were mixed with 0.1 ml. water dispersible cobalt drier and 0.003 inch wet films were applied to glass plates. These were allowed to air dry for 16–18 hours. After this time the n-butylamine film was still tacky. The films were tested for water resistance following the procedure described in Example I. The results given in Table 2 demonstrate the superior performances obtained using the methylamine and ethylamine salts in comparison with the corresponding secondary or tertiary amine salts and the n-butylamine salt.

EXAMPLE 3

Glycerol (138 g.) and tall oil fatty acids (1260 g.) were heated under nitrogen to 230–240° C. and held at this temperature for 8 hours. During this time, water (80 ml.) was distilled off using xylol as an entraining agent. After being cooled, the ester was obtained as a yellow-brown oil.

The tall oil fatty acids/glycerol ester (0180 g.) was heated under nitrogen at 220–225° C. with fumaric acid (120 g.) for 6 hours and then cooled to room temperature.

The fumarized ester (244 g.) was heated to 150° C. and a mixture of ditertiary butyl peroxide (2.44 g.) in styrene (121 g.) was added slowly over 4 hours, while maintaining the temperature at 150° C. A further 0.6 ml. of the peroxide was added and the solution held at 150° C. for another 2 hours, after which the styrenated oil was cooled to room temperature.

Using the procedure described in Example 2, portions of the styrenated copolymer were converted into the methylamine and ethylamine salt solutions. By way of comparison similar solutions were made of the di and trimethylamine and ethylamine salts and also the n-butylamine salt. Films of the solutions containing cobalt driers were laid on glass plates. After air-drying for 16 hours, the films were tested for water resistance as in Example 1. The results given in Table 3 demonstrate the superior performance of the methylamine and ethylamine salts in comparison with the corresponding secondary and tertiary amine salts and the n-butylamine salt.

TABLE 2

| Period of contact with water (mins.) | Monomethylamine | Dimethylamine | Trimethylamine | Monoethylamine | Diethylamine | Triethylamine | n-Butylamine |
|---|---|---|---|---|---|---|---|
| 10 | Unaffected | White, blistered and disintegrated on touching. | Unaffected | Unaffected | White, blistered and disintegrated on touching. | Unaffected | White and disintegrated. |
| 30 | do | | | Slight whitening | do | | Slight whitening |
| 60 | do | | | | do | | Whiter |
| 90 | do | | | | do | | |
| 120 | do | | | Increased whitening. | do | | |
| 150 | do | | | | do | | |
| 180 | do | | | 180 mins. film v. soft and disintegraded on touching. | do | | Film very white |
| 210 | do | | | | do | | |
| 240 | Very slight whitening. | | | | Slight whitening | | 240 mins. film disintegrated. |
| 450 | do | | | | do | | |

TABLE 3

| Period of contact with water (mins.) | Monomethylamine | Dimethylamine | Trimethylamine | Monoethylamine | Diethylamine | Triethylamine | n-Butylamine |
|---|---|---|---|---|---|---|---|
| 10 | Unaffected | Unaffected | Unaffected | Unaffected | Unaffected | Unaffected | White and blistered. |
| 30 | do | Whitening | do | do | Baldly blstered | do | V. soft and blistered. |
| 60 | do | White, soft and badly blistered. | Slight whitening | do | Soft, very badly blistered. Expt. terminated. | White and soft | Film completely broken down. |
| 90 | do | Very soft, badly blistered. | Very white film blistering. | do | | White and very soft. | |
| 120 | do | Expt. terminated | do | do | | do | |
| 150 | do | | Severely blistered Expt. terminated. | do | | do | |
| 180 | do | | | do | | Film severely broken down. Expt. terminated. | |
| 300 | Slight whitening | | | Slight whitening | | | |
| 330 | do | | | do | | | |
| 450 | do | | | do | | | |

I claim:
1. A copolymer salt capable of being dried at ambient temperatures to a water resistant surface coating which comprises a salt of a primary $C_1$ or $C_2$ alkyl amine and a copolymer formed by (a) reacting an ester of a polyhydric alcohol and an unsaturated fatty acid having at least 12 carbon atoms in the carbon chain containing the unsaturation with an acyclic olefinically unsaturated dicarboxylic acid or anhydride having less than 10 carbon atoms in any carbon chain and (b) copolymerizing the reaction product so formed with up to 50 percent by weight in relation to the total weight of reactants initially present of an unsaturated monomer copolymerizable therewith.

2. A copolymer salt as claimed in claim 1 wherein the proportion by weight of dicarboxylic acid initially present in the reaction mixture used to form the reaction product of the ester of the unsaturated fatty acid and the dicarboxylic acid is in the range 5 to 25 percent.

3. A copolymer salt as claimed in claim 1 wherein the copolymer has an acid value in the range 25 to 100 milligrams of potassium hydroxide per gram.

4. A copolymer salt as claimed in claim 1 wherein the amine is methylamine.

5. A water dilutable surface coating composition containing a salt of a copolymer as claimed in claim 1.

References Cited

UNITED STATES PATENTS

| | | | |
|---|---|---|---|
| 2,941,968 | 6/1960 | McKenna | 260—23 |
| 3,030,321 | 4/1962 | Lombardi et al. | 260—23 |
| 3,253,938 | 5/1966 | Hunt | 260—18 |
| 3,293,201 | 12/1966 | Shahade et al. | 260—23 |
| 3,364,162 | 1/1968 | Huggard | 260—22 |
| 3,366,563 | 1/1968 | Hart et al. | 204—181 |

DONALD E. CZAJA, Primary Examiner

R. W. GRIFFIN, Assistant Examiner

U.S. Cl. X.R.

117—124, 161, 167; 260—23, 23.7, 31.4, 33.4, 32.6, 40, 41